US006654251B2

(12) United States Patent
Yun

(10) Patent No.: US 6,654,251 B2
(45) Date of Patent: Nov. 25, 2003

(54) ACTUATION OF TRAY AND DOOR USED FOR INSERTING AND REMOVING AN OPTICAL STORAGE UNIT TO AND FROM A COMPUTER

(75) Inventor: Suk-Ju Yun, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 34 days.

(21) Appl. No.: 10/136,278

(22) Filed: May 2, 2002

(65) Prior Publication Data

US 2003/0103334 A1 Jun. 5, 2003

(30) Foreign Application Priority Data

Dec. 5, 2001 (KR) ........................................ 2001-76647

(51) Int. Cl.[7] ................................................ G06F 1/16
(52) U.S. Cl. ...................... 361/724; 174/59; 312/223.2; 348/273; 361/682
(58) Field of Search ................................ 361/724–727, 361/680–687; 174/50–59; 257/678–679; 312/223.1–223.6; 348/273, 787, 789, 836

(56) References Cited

U.S. PATENT DOCUMENTS 6,392,876 B1 * 5/2002 Ramonowski ............. 361/683
6,456,489 B1 * 9/2002 Davis et al. ................ 361/684
6,487,071 B1 * 11/2002 Tata et al. .................. 361/685
6,490,152 B1 * 12/2002 White et al. ............... 361/684

FOREIGN PATENT DOCUMENTS

| JP | 3-41328 | 4/1991 |
| JP | 3020681 | 11/1995 |
| JP | 9-237134 | 9/1997 |
| KR | 1996-42625 | 12/1996 |
| KR | 1997-2781 | 1/1997 |
| KR | 1998-38658 | 9/1998 |
| KR | 20-179366 | 2/2000 |
| KR | 20-197846 | 7/2000 |

* cited by examiner

Primary Examiner—Darren Schuberg
Assistant Examiner—Hung Van Duong
(74) Attorney, Agent, or Firm—Robert E. Bushnell, Esq.

(57) ABSTRACT

A computer having a chassis having an opening for access to an optical storage drive unit. The optical storage drive unit is actuated by a button attached to a door on a front cover of the computer. The door is perforated by a hole enabling a user to push this button, which either directly pushes the operational button on the drive or pushes a linking part that then pushes an operational button on the drive to open the door and extend a tray out. If, for some reason, the button on the door is not aligned well with the button on the drive, only the door needs to be replaced as opposed to the entire front cover or the entire chassis.

23 Claims, 12 Drawing Sheets

ACTUATION OF TRAY AND DOOR USED FOR INSERTING AND REMOVING AN OPTICAL STORAGE UNIT TO AND FROM A COMPUTER

CLAIM OF PRIORITY

This application makes reference to, incorporates the same herein, and claims all benefits accruing under 35 U.S.C. '119 from my application COMPUTER filed with the Korean Industrial Property Office on Dec. 5, 2001 and there duly assigned Serial No. 76647/2001.

BACKGROUND OF THE INVENTION

1. Field of the Invention

The present invention relates in general to a computer, and more particularly, to a computer improved in a structure for sliding a tray for an optical storage unit adjacent a casing.

2. Description of the Related Art

In order to present a fine appearance and to protect an optical storage unit such as a CD-ROM (compact disk read only memory) drive, a DVD (digital versatile disk) drive, a CD-RW (compact disk rewritable) drive, etc. from dust, a conventional computer includes a door. The door has a power switch disposed thereon. If the computer also has a drive for a CD-ROM, DVD and/or a CD burner, the drive for operating these optical disks is located within the computer chassis or frame or casing. To access the drive, a door is disposed on the front cover. In addition, the front cover has a separate button located near the door to open the door and extend a tray outward in front of the front cover enabling a user to insert or remove a CD disk or a DVD disk. This same button is also used to retract the tray to within the drive and to close the door covering the drive to protect the optical disk from accumulating unwanted dust.

The button on the front cover that actuates the door and the tray is a button that resides on the front cover that can be actuated by the user. The button pushed by the user pushes another button located on the drive to actuate the tray and the door. However, if for some reason the button actuated by the user is not perfectly aligned with the button on the drive itself, the drive and the door and the tray will be rendered inoperable. In such a scenario, the entire chassis needs to be replaced so that the button and the button hole on the front cover aligns perfectly with a button disposed on the outside of the drive used to read or write to a CD disk or a DVD disk.

SUMMARY OF THE INVENTION

Accordingly, it is an object of the present invention to provide an improved design for user actuation of an optical disk drive.

It is also an object of the present invention to provide a design for a computer so that when the button on the front cover of the computer is misaligned with the operational button on the optical disk drive, the repair of the computer will be less drastic than requiring replacement of the entire computer chassis or even replacement of the entire front cover or panel.

These and other objects of the present invention may be accomplished by the provision of a computer having a casing having a door that can swing open and expose the optical storage unit and cause the optical storage unit to extend a tray allowing a user to remove and/or insert an optical storage disk where the button that the user presses to actuate the tray and the door is attached to the rear side of the door instead of being attached to the computer chassis or the front cover. The door for the optical storage unit is easily removable from the front cover or the chassis, allowing for easy and inexpensive repair should the button for door and tray actuation should become misaligned with an operational button on the optical storage unit.

Preferably, on the door is provided a button through hole through which the button pushing part is exposed, and the computer further comprises a supporting bar having a first end coupled to the button pushing part and a second end pivoted upon the rear of the door so as to elastically restore the button pushing part so that the first end is repositioned in the through hole after actuation.

Preferably, the computer further includes an elastic member restoring the door from the open position to the closed position, and the elastic member is comprised of a coil spring having a first end coupled to the door and a second end coupled to the casing.

In a separate embodiment, the button pushing part is disposed on an angled portion of the front panel near the side of the computer chassis, the computer further includes a link part provided between the button pushing part and the operation button and linking the movement of the button pushing part to the push of the operation button, and the link part is comprised of a push lever positioned between the button pushing part and the operation button; and a lever supporting part fixed on the casing and guiding the push lever. The link part of the computer further includes a spring provided at the push lever and restoring the push lever in a direction opposite to a pushing direction, and a stopper or screw for preventing the spring from a breakaway.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
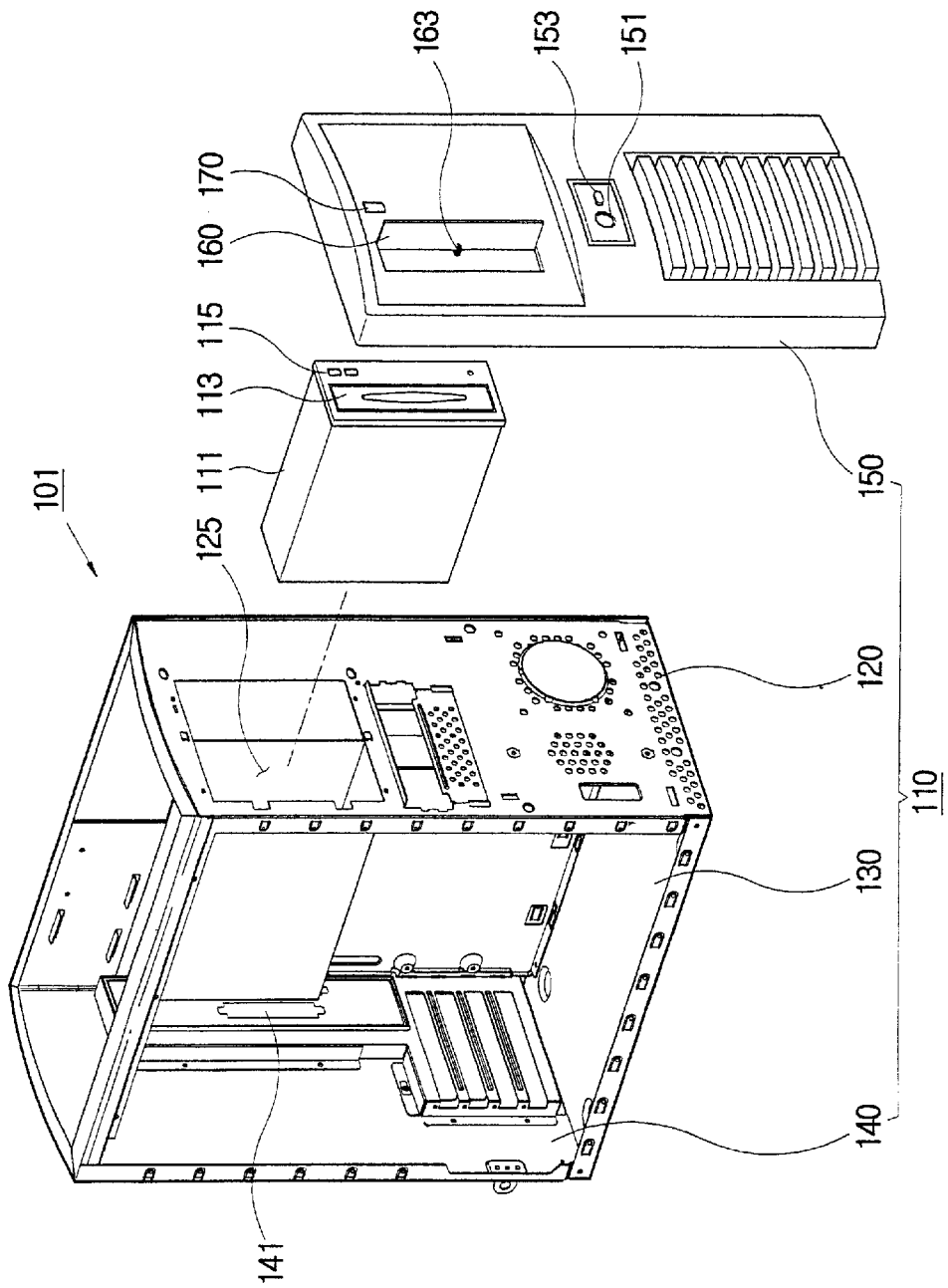
FIG. 1 is an exploded perspective view of a computer.

The computer system equipped with the door, as shown in FIG. 1, comprises a main body 101 including a casing 110 and a plurality of hardware components such as an optical storage unit 111, etc. accommodated in the casing 110, and a monitor (not shown) outputting a video signal received from the main body 101 thereon. The optical storage unit 111 such as a CD-ROM drive, a DVD drive, a CD-RW drive, etc. is comprised of a tray 113 in which an optical disk is put, and an operation button 115 operating the tray 113 to be slid out of the casing 110. The casing 110 is comprised of a front panel 120 having an opening 125 through which an auxiliary storage unit such as the optical storage unit 111, etc. is inserted, a rear panel 140 having a plurality of connector slots 141 through which peripheral units are connected to the main body 101, a supporting panel 130 forming a floor and a side wall between the front and rear panels 120 and 140, and a plate cover (not shown) having an inverted AU@ shape and forming a housing space together with the front, rear and supporting panels 120, 140 and 130, thereby forming an outer appearance.

The front panel 120 is combined with a front casing 150. On the center area of the front casing 150 are, as shown in FIG. 1, provided a power switch 151 for turning on the computer system and a reset switch 153. Further, at a position corresponding to the opening 125 on the front casing 150 are separately provided a door 160 rotatably opened and closed according as the tray 113 is slid out of and into the casing 110, and a button pushing part 170 through which the operation button 115 is pushed so as to slide the tray 113 out of or into the casing 110.

The door 160 is made of plastics, and rotatably covers and uncovers the opening 125 according as the tray 113 is slid out of and into the casing 110. Thus, the door 160 protects the optical storage unit 111 from dust by covering it. Herein, in the door 160 and the front casing 150 are provided hinge projections (not shown) and hinge grooves (not shown), respectively, so that the door 160 is rotatably combined to the front casing 150 by means of the hinge projections and the hinge grooves.

Figure 2A:
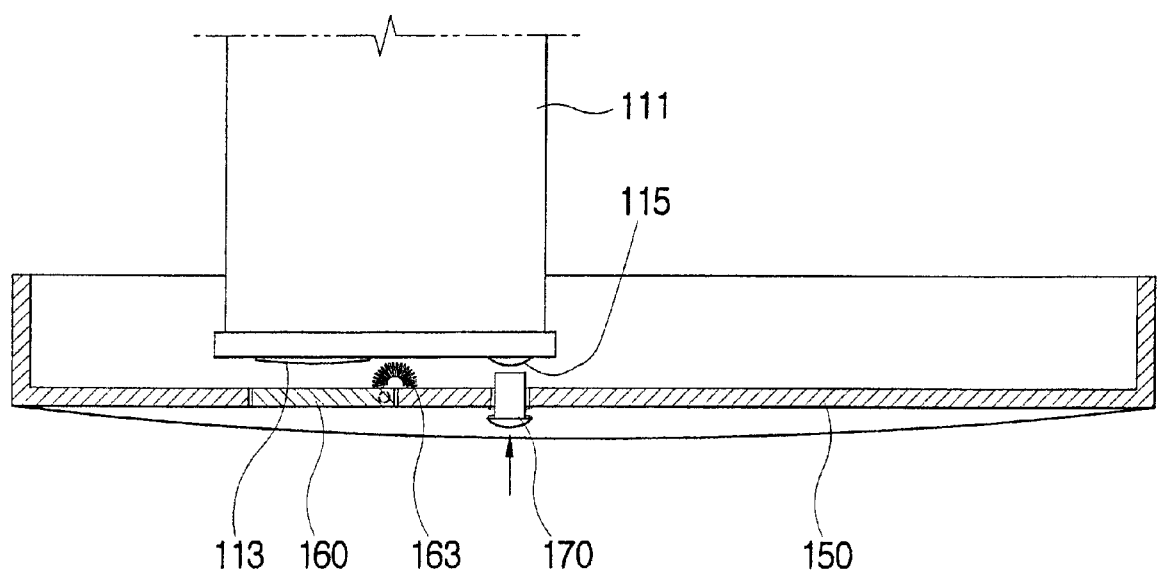
FIGS. 2a and 2b are section views of a tray to be slid out of the casing of FIG. 1.
Figure 2B:
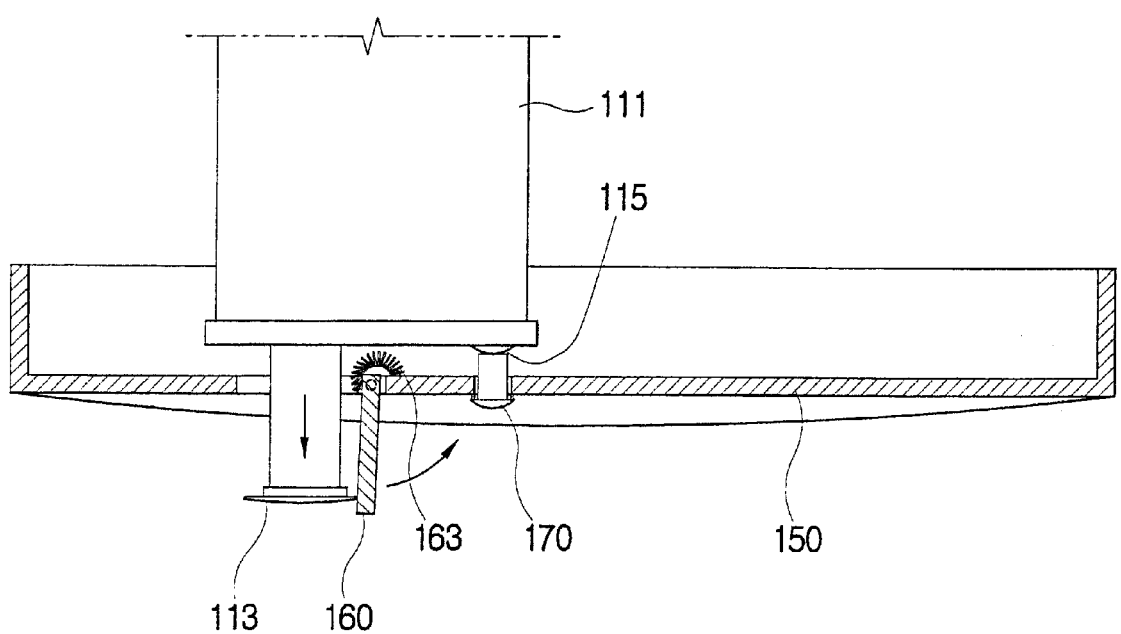

Further, as shown in FIGS. 2a and 2b, at the rear of the door 160 is provided a coil spring 163 having a first end coupled to the rear of the door 160 and a second end coupled to the inside of the front casing 150, thereby restoring the door 160 from the open position to the closed position. As shown in FIG. 1, the button pushing part 170 is made of plastics separately from the door 160, and has a front part exposed to the outside of the front casing 150 and a rear part adjacent to the operation button 115 of the optical storage unit 111. Therefore, if the front part of the button pushing part 170 is pushed, the rear part of the button pushing part 170 pushes the operation button 115, thereby allowing the tray 113 to be slid out of the casing 110.

With this configuration, in the computer, if the button pushing part 170 is pushed, the rear part of the button pushing part 170 pushes the operation button 115, and then the tray 113 is slid out of the casing 110, rotating the door 160 from the closed position to the open position (refer to FIG. 2b). Further, if the tray 113 is pushed in an insertion direction, the tray 113 is slid into the casing 110. Herein, the door 160 is restored from the open position to the closed position by the coil spring 163. However, in the computer of FIGS. 1–2b, because the button pushing part 170 and the door 160 are, as shown in FIG. 1, separately manufactured, and because the button pushing part is exposed to a user through a hole in the chassis and not a hole in the door and because the button pushing part is attached to the computer chassis and not the door, the whole chassis must be replaced if the button pushing part is not aligned with the operational button. The button pushing part 170 may not push the operation button 115 of the optical storage unit 111 when the above-described components are not fitted in their precise positions. Further, the whole casing 110 should be replaced by a different one because the button pushing part 170 becomes useless when the optical storage unit 111 is not accommodated in the casing 110.

Figure 3:
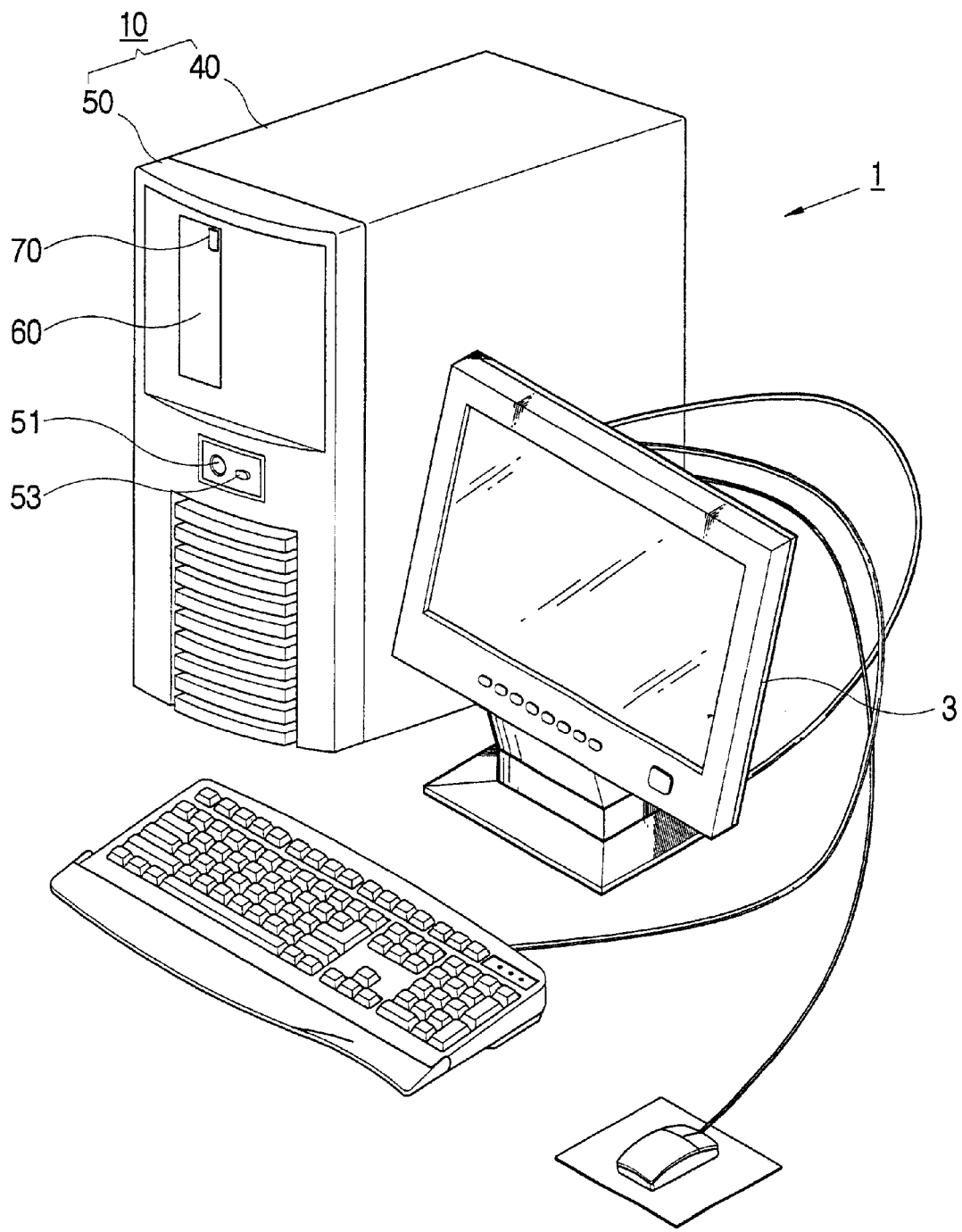
FIG. 3 is a perspective view of a computer system according to a first embodiment of the present invention.
Figure 4:
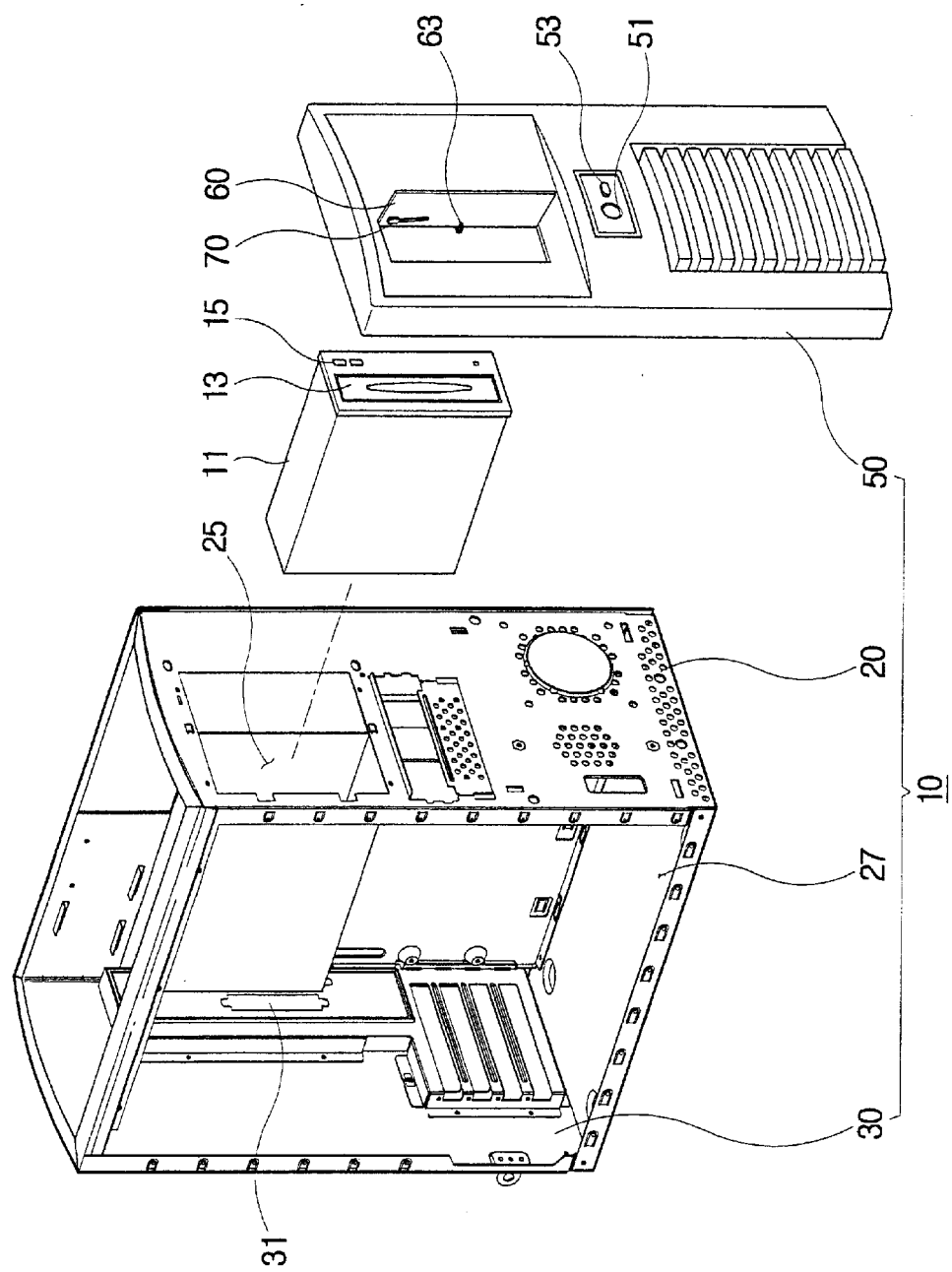
FIG. 4 is an exploded perspective view of a casing for the computer according to the first embodiment of the present invention.

As shown in FIG. 3, a computer system according to a first embodiment of the present invention comprises a main body 1 including a casing 10 and a plurality of hardware components such as an optical storage unit 11, etc. accommodated in the casing 10, and a monitor 3 outputting a video signal received from the main body 1 thereon. The optical storage unit 11 such as a CD-ROM drive, a DVD drive, a CD-RW drive, etc. is comprised of a tray 13 in which an optical disk is put, and an operation button 15 operating the tray 13 to be slid out of the casing 10. The casing 10 is, as shown in FIGS. 3 and 4, comprised of a front panel 20 having an opening 25 through which an auxiliary storage unit such as the optical storage unit 11, etc. is inserted, a rear panel 30 having a plurality of connector slots 31 through which peripheral units are connected to the main body 1, a supporting panel 27 forming a floor and a side wall between the front and rear panels 20 and 30, and a plate cover 40 having an inverted AU@ shape and forming a housing space together with the front, rear and supporting panels 20, 30 and 27, thereby forming an outer appearance. The front panel 20 is combined with a front casing 50. On the center area of the front casing 50 are provided a power switch 51 for turning on the computer system and a reset switch 53. Further, at a position corresponding to the opening 25 on the front casing 50 is provided a door 60 rotatably opened and closed according as the tray 13 is slid out of and into the casing 10.

Figure 5:
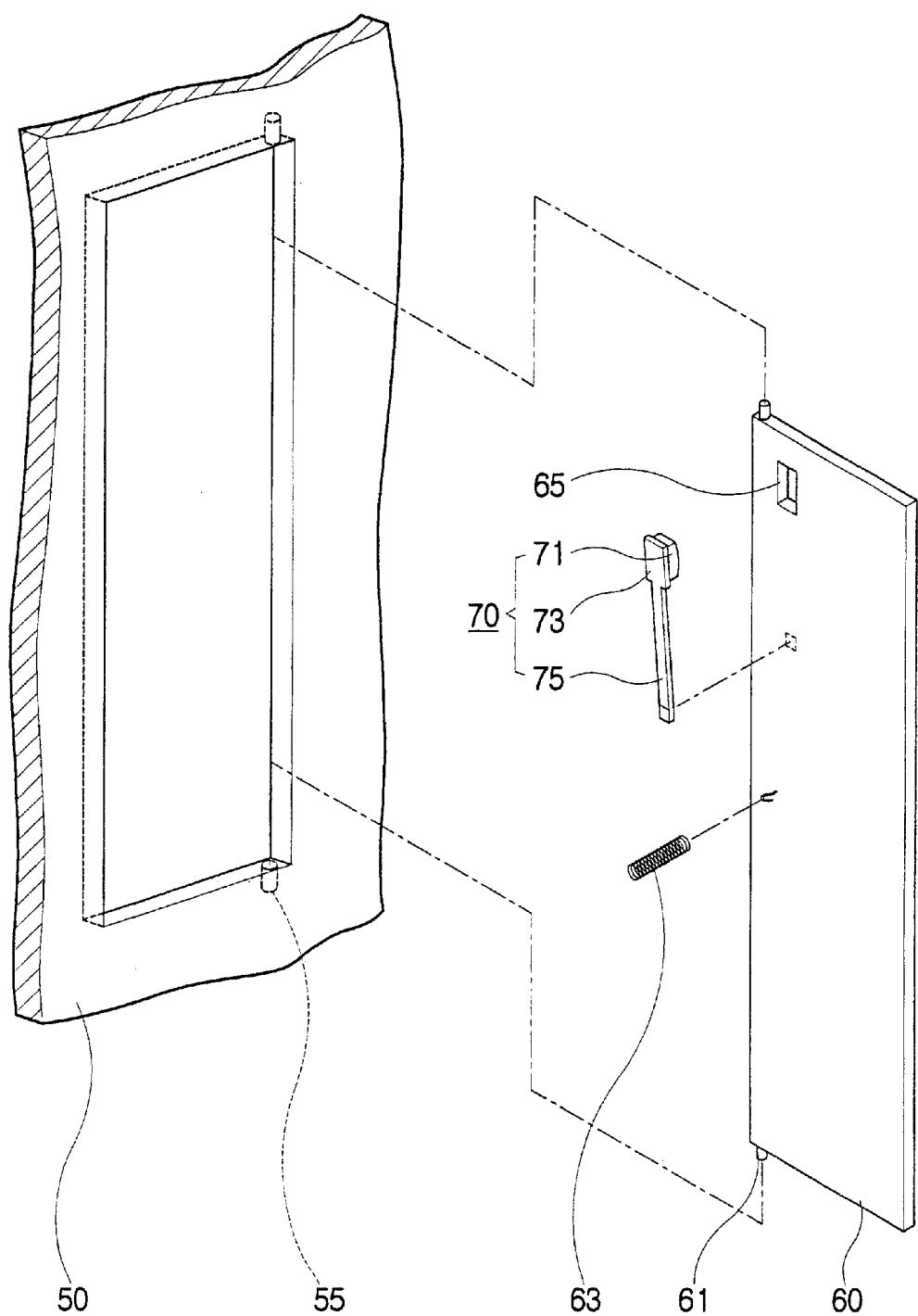
FIG. 5 is an enlarged exploded-perspective view of a main part of FIG. 4.

The door 60 is made of plastics, and, as shown in FIG. 5, includes hinge projections 61 each protruded from opposite corners thereof, and a button through hole 65 through which a button pushing part 70 (to be described later) is protruded. The hinge projections 61 are each combined to hinge grooves 55 provided in the front casing 50, thereby allowing the door 60 to rotatably cover and uncover the opening 25 according as the tray 13 is slid out of and into the casing 10. As shown in FIG. 5, at the rear of the door 60 is provided a coil spring 63 having a first end coupled to the rear of the door 60 and a second end coupled to the inside of the front casing 50, thereby restoring the door 60 from the open position to the closed position.

The button pushing part 70 is made of elastic plastics like the door 60, and, as shown in FIG. 5, comprised of a push part 71 exposed to the outside of the door 60 through the button through hole 65, a contact part 73 provided at the backside of the push part 71 for pushing the operation button 15, and a supporting bar 75 extended from the contact part 73 and pivoted upon the rear of the door 60. Herein, the supporting bar 75 and the door 60 can be combined by cold welding, or etc.

Figure 6A:
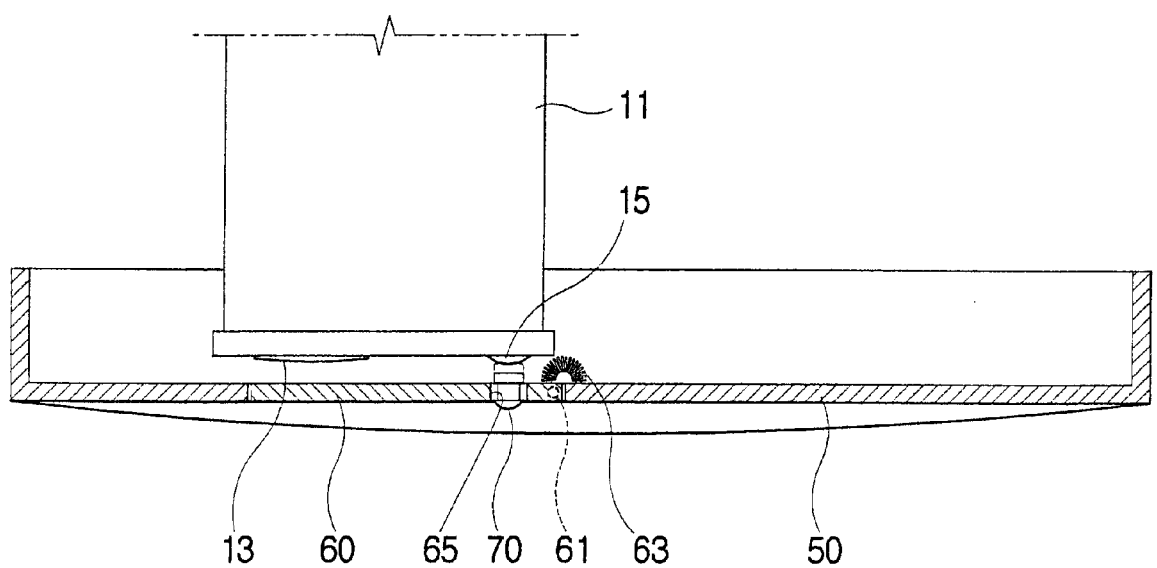
FIGS. 6a and 6b are section views of a tray to be slid out of the casing of FIG. 4.
Figure 6B:
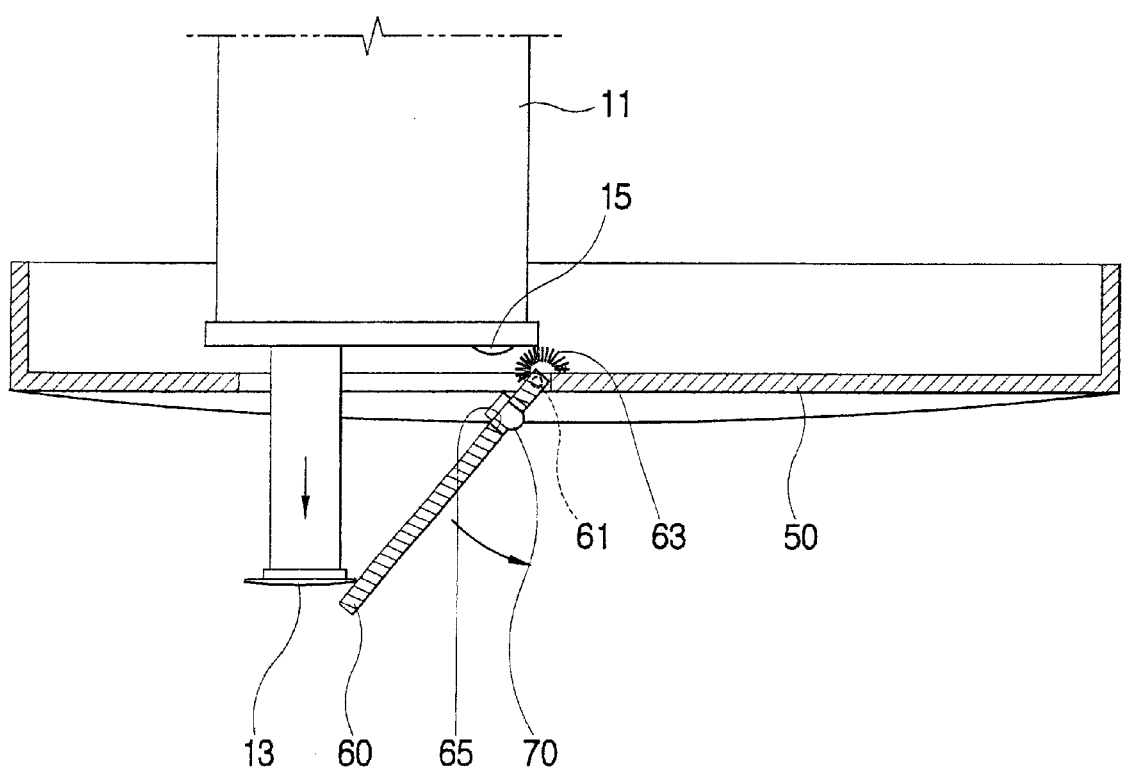

Thus, if a user pushes the push part 71 of the button pushing part 70 exposed to the outside through the button through hole 65 so as to slide the tray 13 out of the casing 10, the contact part 73 incorporated with the push part 71 simultaneously pushes the operation button 15 of the optical storage unit 11 (see FIG. 6a). Then, the tray 13 is, as shown in FIG. 6b, slid out of the casing 10. Thereafter, if a user stops pushing the push part 71, the supporting bar 75 pivoted upon the rear of the door 60 elastically restores the button pushing part 70 to an original position.

With this configuration, the casing 10 for the computer according to the present embodiment, if the button pushing part 70 exposed to the outside through the button through hole 65 is pushed so as to slide the tray 13 out of the casing 10, the contact part 73 of the button pushing part 70 pushes the operation button 15. Then, the tray 13 is slid out of the casing 10, rotating the door 60 from the closed position to the open position (refer to FIG. 6b). Then, if pushing the push part 71 is stopped, the button pushing part 70 is elastically restored to the original position by means of the supporting bar 75.

Further, if the tray 13 is pushed in an insertion direction, that is, inside the casing, the tray 13 is slid into the casing 10. At this time, the door 60 is restored from the open position to the closed position by means of the coil spring 63. As described above, the button pushing part 70 is mounted on the door 60, not on the front casing 50, so that the button pushing part 70 can push the operation button 15 of the optical storage unit 11 without wrong operation, and also it is economical because only the door 60, not the whole casing 10, is replaced by a different one when the optical storage unit is not accommodated in the casing 10, while maintaining a fine appearance and protecting the optical storage unit 11 from dust.

Figure 7:
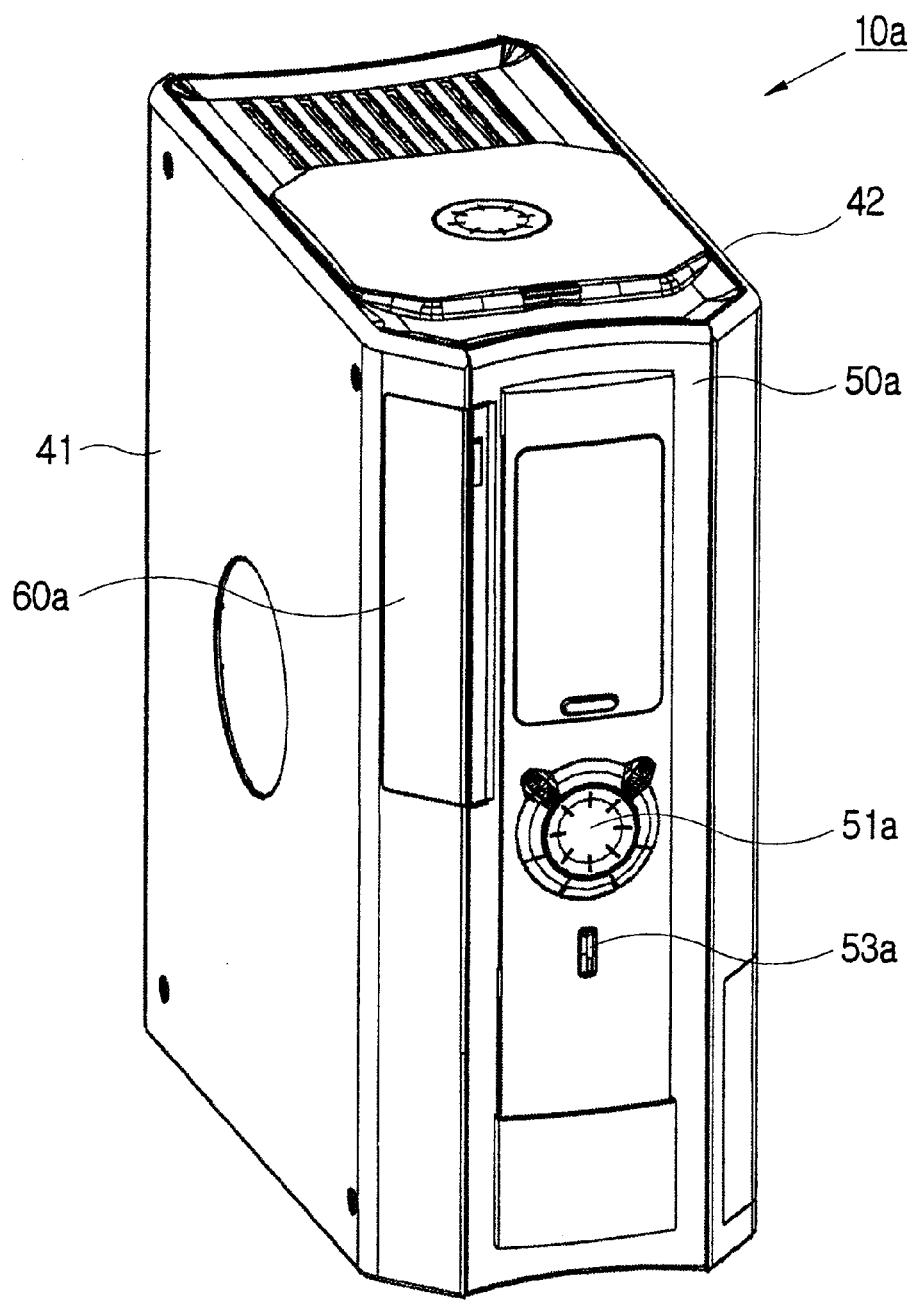
FIG. 7 is a perspective view schematically showing a casing of a computer according to a second embodiment of the present invention.

FIG. 7 schematically shows a casing for computer according to a second embodiment of the present invention. The casing is different from the casing according to the first embodiment in a casing 10a which is comprised of left and right casings 41 and 42 forming opposite side walls, and a front casing 50a combined to the left and right casings 41 and 42. The left and right casings 41 and 42 have angled parts 41a and 42a bent at a predetermined angle to the front casing 50a, and on the angled part 41a of the left casing 41 is provided an opening 43 through which the tray 13 is slid out of and into the casing 10a. On the center area of the front casing 50a are provided a power switch 51a for turning on the computer system and a reset switch 53a. Further, on the front casing 50 is provided a door 60a covering and uncovering the opening 43 according as the tray 13 is slid out of and into the casing 10a.

The door 60a is made of plastics and disposed at a predetermined angle to correspond to the angled part 41a of the left casing 41 so as to cover the opening 43, and includes hinge projections 61a for being combined to the front casing 50a, a twist coil spring (not shown) for restoring the door 60a to the original position, like the coil spring 63 of the first embodiment, and a button through hole 65a through which a button pushing part 70a is protruded.

Figure 8:
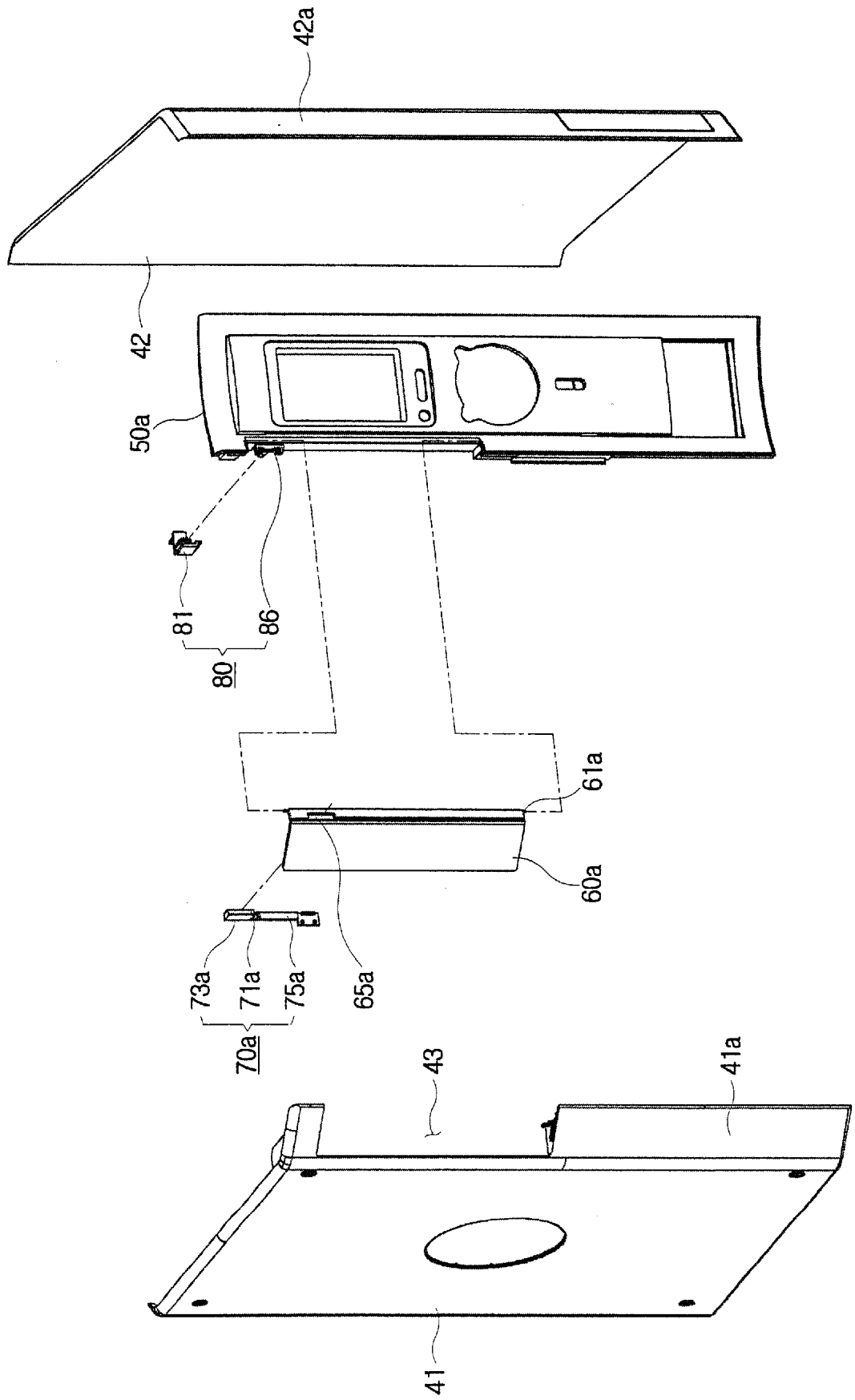
FIG. 8 is an exploded perspective view showing side casings and a front casing of the casing of FIG. 7.

The button pushing part 70a is made of plastics like the door 60a, and, as shown in FIG. 8, comprised of a push part 71a exposed to the outside of the door 60a through the button through hole 65a, a contact part 73a provided at the backside of the push part 71a, and a supporting bar 75a extended from the contact part 73 and having a lower end pivoted upon the rear of the door 60.

Between the button pushing part 70a and the operation part 15 is provided a link part 80 linking the movement of the button pushing part 70a to the push of the operation button 15. The link part 80 is comprised of a push lever 81 positioned between the contact part 73a of the button pushing part 70a and the operation button 15, and a lever supporting part 86 guiding the push lever 81.

Figure 9:
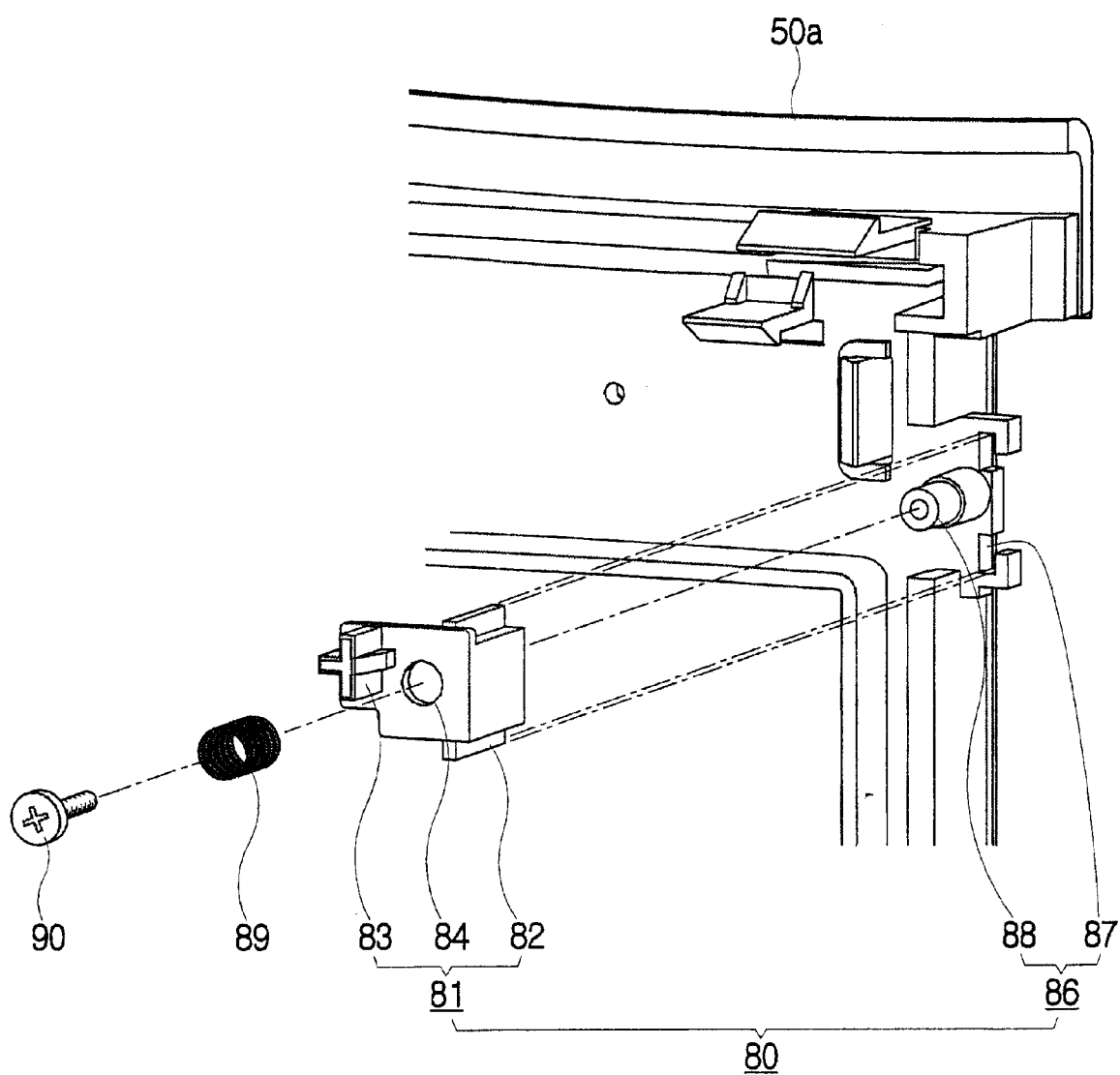
FIG. 9 is a rear view of the front casing of FIG. 7.
Figure 10:
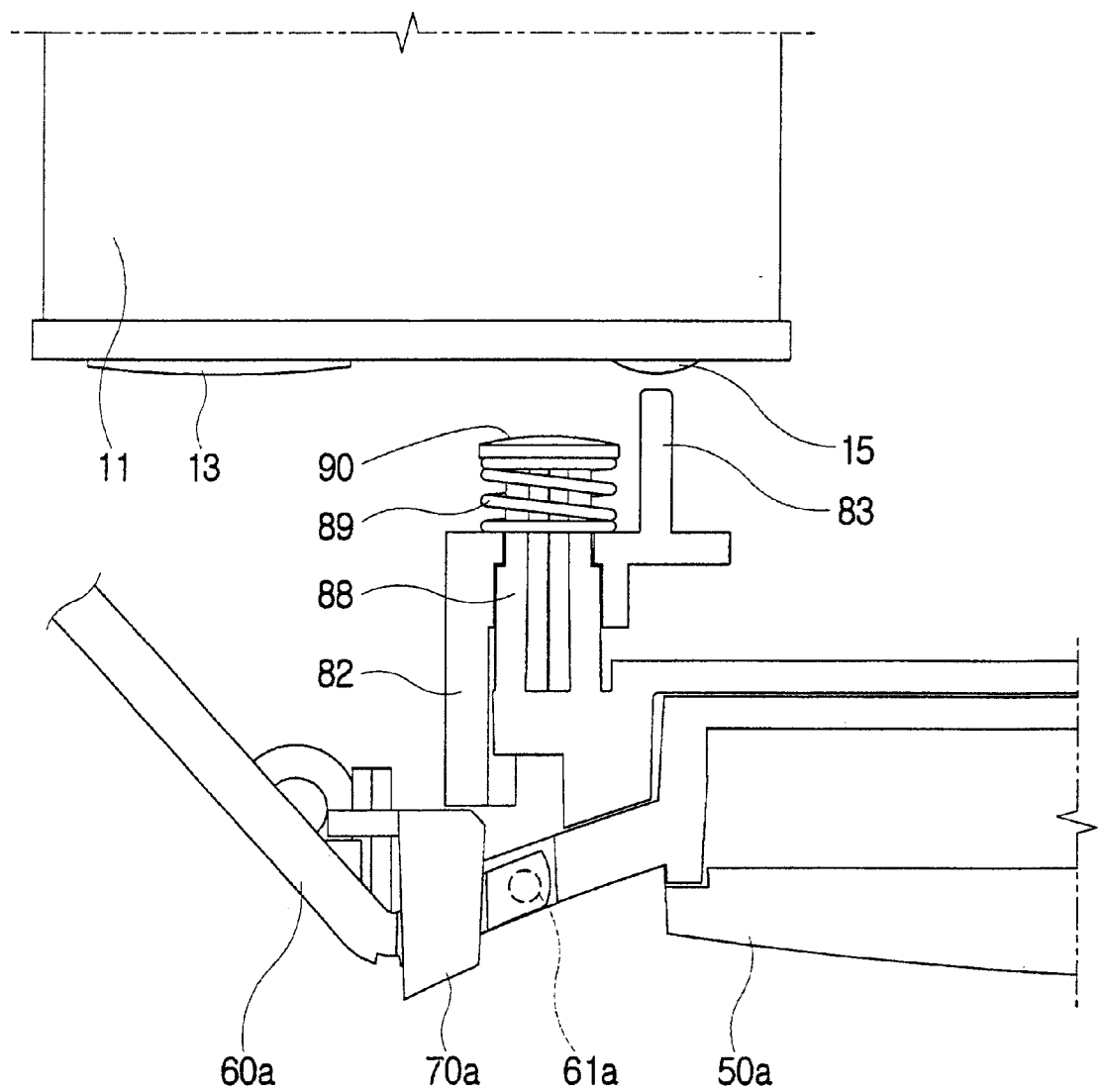
FIG. 10 is a section view of a tray to be slid out of the casing of FIG. 7.

As shown in FIGS. 9 and 10, the push lever 81 is comprised of a rail block 82 having one end being in contact with the contact part 73a and moving along a guiding rail 87 (to be described later) of the lever supporting part 86, a pushing pin 83 extended from the rail block 82 and spaced from the operation button 15 at a predetermined distance for pushing the operation button 15 in response to pushing of a user, and a projection through hole 84 provided thereon and allowing a projection 88 of the lever supporting part 86 to pass there through. As shown in FIG. 9, the lever supporting part 86 is comprised of the guiding rail 87 extended from the front casing 50a at a position adjacent to the door 60a and guiding the push lever 81, accommodating the rail block 82 of the push lever 81, and the projection 88 and guiding the push lever 81, being inserted in the projection through hole 84. At the rear of the projection 88 inserted in the through hole 84 are provided a spring 89 restoring the push lever 81 to the original position, and a screw 90 employed as a stopper for preventing the spring 89 from a breakaway.

With this configuration, if the push part 71a of the button pushing part 70a is pushed so as to slide the tray 13 out of the casing 10a, the contact part 73a incorporated with the push part 71a simultaneously pushes the push lever 81. Then, the push lever 81 moves toward the operation button 15 along the lever supporting part 86 extended from the rear of the front casing 50a, and pushes the operation button 15. Herein, if pushing the button pushing part 70a is stopped, the push lever 81 is elastically restored to the original position by means of the spring 89 put on the projection 88. Simultaneously, the button pushing part 70a is also elastically restored to the original position by means of the supporting bar 75a. Thus, when the button pushing part is spaced from the operation button at a predetermined distance, the link part for linking the movement of the button pushing part to the push of the operation button is provided there between, thereby enabling the tray 13 to be slid out of and into the casing 10a.

Further, if the tray 13 is pushed in an insertion direction, that is, inside the casing, the tray 13 is slid into the casing 10a. At this time, the door 60a is restored from the open position to the closed position by means of the coil spring 63. As described above, the button pushing part 70a is mounted on the door 60a, not on the front casing 50a, so that the button pushing part 70a can push the operation button 15 of the optical storage unit 11 without wrong operation, and also it is economical because only the door 60a, not the whole casing 10a, is replaced by a different one when the optical storage unit is not accommodated in the casing 10a, while maintaining a fine appearance and protecting the optical storage unit 11 from dust. Also, unlike the first embodiment, the door 60a is disposed on an angled portion 41a between side casing 41 and front casing 50a for better external appearance.

As described above, there is provided a computer comprising a door rotatable between open and closed positions according as a tray is slid out of and into a casing, and a button pushing part provided on the door, so that the button pushing part of the door can push an operation button of the optical storage unit without wrong operation.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A computer, comprising:
   a casing having an opening,
   an optical storage unit comprising a tray accommodating an optical disk accessed through said opening in said casing;
   a door that rotates between uncovering said opening and covering said opening enabling said optical disk to be entered into and removed from said optical storage unit in said computer;

an operation button operating said tray and said door enabling user insertion of said optical disk into said optical storage unit in said computer; and a button pushing part attached to said door, said button pushing part actuating said operation button when pushed.

2. The computer according to claim 1, wherein on the door is provided a button through hole through which the button pushing part is exposed.

3. The computer according to claim 2, said button pushing part having a proximal end attached to a rear side of said door, said button pushing part having a distal end comprising a push part for user actuation and a contact part opposite said push part for forming contact with said operation button, said button pushing part being elastic to automatically restore the button pushing part so that the distal end of said button pushing part to said through hole in said door.

4. The computer according to claim 2, further comprising an elastic member restoring the door from the open position to the closed position upon user actuation of said tray.

5. The computer according to claim 2, further comprising a link part provided between the button pushing part and the operation button and linking the movement of the button pushing part to the push of the operation button.

6. The computer according to claim 4, wherein the elastic member is comprised of a coil spring having a first end coupled to the door and a second end coupled to the casing.

7. The computer of claim 4, said optical storage unit being selected from a group consisting of a CD-ROM drive, a DVD drive and a CD-RW drive.

8. The computer according to claim 5, wherein the link part is comprised of:

a push lever positioned between the button pushing part and the operation button; and a lever supporting part fixed on the casing and guiding the push lever.

9. The computer according to claim 8, further comprising a spring provided at the push lever and restoring the push lever in a direction opposite to a pushing direction.

10. The computer according to claim 9, further comprising a stopper for preventing the spring from a breakaway.

11. A computer, comprising:

a computer frame comprising a front panel, a rear panel and a supporting panel connecting said front panel to said rear panel, said front panel being perforated by an opening to accommodate an optical storage unit;

a central processing unit, a non-volatile memory, a volatile memory, an input part and an output part; and a front casing covering said front panel of said computer frame, said front casing comprising a door pivotally attached to said front casing, said door being rotatably opened and closed to expose said optical storage unit disposed inside said opening in said front panel of said casing, said optical storage unit having an operational button disposed on said optical storage unit, said operational button facing said front casing that covers said front panel of said computer frame, said operational button, when pushed, serves to rotate said door open and to extend a tray, initially disposed within said optical storage unit, through said opening enabling a user to load or unload an optical disk onto or from said tray, said tray capable of being retracted back into said optical storage unit said door being perforated by a hole exposing a button pushing part, said button pushing part being attached to a rear side of said door, said button pushing part being aligned with said operational button of said optical storage unit when said door is closed enabling a user to actuate said operational button of said optical storage unit by pressing said button pushing part attached to said door when said door is closed.

12. The computer of claim 10, said front casing further comprising a coil spring serving to open and close said door.

13. The computer of claim 11, said door being easily removable from said front casing enabling easy repair of said computer when said button pushing part and said hole in said door are not perfectly aligned with said operational button disposed on said optical storage unit disposed in said opening of said front panel of said computer frame.

14. The computer of claim 11, said front casing further comprising a power switch.

15. The computer of claim 11, said optical storage unit being selected from a group consisting of a CD-ROM drive, a DVD drive and a CD-RW drive.

16. The computer of claim 11, pushing said tray towards said optical storage unit automatically causes said tray to be retracted to within said optical storage unit and said door to be closed.

17. The computer of claim 12, said coil spring having a first end connected to a rear side of said front casing and a second end opposite said first end, said second end connected to said rear side of said door, said rear side of said front casing facing said front panel of said computer frame and said rear side of said door facing said optical storage unit when said door is closed.

18. A computer, comprising:

a computer frame comprising a front panel, a rear panel and a supporting panel connecting said front panel to said rear panel, said front panel being perforated by an opening to accommodate an optical storage unit;

a central processing unit, a non-volatile memory, a volatile memory, an input part and an output part;

a front casing covering said front panel of said computer frame;

a left and a right side casings, said left and said right side casings each having an angled part, said angled part of said left and said right side casings being attached to said front casing, one of said angled parts of said left and said right side casings having an opening, said front casing having a door hingedly attached thereto, said door covering said opening in one of said angled parts when said door is in a closed position, said door being perforated by a small hole to accommodate a push part of said button pushing part, said button pushing part being attached to a rear side of said door, said door capable of exposing a front side of said optical storage unit, said front side of said optical storage unit having an operational button, when pushed, opens said door and extends a tray forward to protrude in front of said front casing enabling a user to insert or remove an optical disk from said optical storage unit inside said computer; and a linking part disposed between said operational button and said button pushing part transferring user actuation of said button pushing part to said operational button when said door is in a closed position.

19. The computer of claim 18, said linking part comprising:

a push lever serving to transfer force applied to said button pushing part to said operational button;

a supporting part disposed on said front casing for guiding said push lever when said button pushing part is actuated by a user; and a spring biased to keep said push lever away from said operational button absent user actuation of said button pushing part.

20. The computer of claim 18, said door being easily removable from said front casing enabling easy repair of said computer when said button pushing part and said hole in said door are not perfectly aligned with said linking part.

21. The computer of claim 18, said optical storage unit being selected from a group consisting of a CD-ROM drive, a DVD drive and a CD-RW drive.

22. The computer of claim 18, pushing said tray towards said optical storage unit automatically causes said tray to be retracted to within said optical storage unit and said door to be closed.

23. The computer of claim 19, said supporting part comprising a guide rail, said push lever comprising a rail block that forms direct contact with said button pushing part, a pushing pin that forms direct contact with said operational button when said button bushing part is actuated, and a rail block that is guided by said guide rail disposed on said front casing.

\* \* \* \* \*